United States Patent
Costa et al.

(10) Patent No.: US 6,862,455 B1
(45) Date of Patent: Mar. 1, 2005

(54) SIGNALLING RADIO SERVICE REQUIREMENTS

(75) Inventors: Mauro Costa, Chippenham (GB); Michael Roberts, Southend-on-Sea (GB); Sutha Sivagnanasundaram, Tooting (GB)

(73) Assignee: Lucent Technologies Inc., Murray Hill, NJ (US)

( * ) Notice: Subject to any disclaimer, the term of this patent is extended or adjusted under 35 U.S.C. 154(b) by 391 days.

(21) Appl. No.: 09/587,524

(22) Filed: Jun. 5, 2000

(30) Foreign Application Priority Data

Jun. 8, 1999 (EP) ............................................ 99304440

(51) Int. Cl.[7] .................................................. H04Q 7/30
(52) U.S. Cl. ........................ 455/458; 455/434; 455/515; 370/229; 370/338
(58) Field of Search ............................. 455/426, 422.1, 455/450, 517, 445, 552, 555, 554, 434, 422; 370/60.1, 229, 337, 347, 338; 375/1, 68

(56) References Cited

U.S. PATENT DOCUMENTS

| | | | | |
|---|---|---|---|---|
| 5,103,459 A | * | 4/1992 | Gilhousen et al. | 370/206 |
| 5,392,452 A | | 2/1995 | Davis | 455/38.1 |
| 5,502,721 A | * | 3/1996 | Pohjakallio | 370/336 |
| 5,613,198 A | * | 3/1997 | Ahmadi et al. | 370/337 |
| 5,673,259 A | * | 9/1997 | Quick, Jr. | 370/342 |
| 5,706,331 A | | 1/1998 | Wang et al. | 379/58 |
| 5,748,104 A | * | 5/1998 | Argyroudis et al. | 455/419 |
| 5,940,756 A | * | 8/1999 | Sibecas et al. | 455/426.1 |
| 6,097,733 A | * | 8/2000 | Basu et al. | 370/468 |
| 6,208,619 B1 | * | 3/2001 | Takeuchi | 370/229 |
| 6,539,237 B1 | * | 3/2003 | Sayers et al. | 455/555 |

FOREIGN PATENT DOCUMENTS

| WO | WO 95/26113 | 9/1995 | ............ H04Q/7/22 |
|---|---|---|---|
| WO | WO 97/32408 | 9/1997 | ............ H04B/7/26 |

OTHER PUBLICATIONS

European Search Report Dated Jan. 19, 2000.

* cited by examiner

*Primary Examiner*—David Hudspeth
*Assistant Examiner*—Kamran Afshar

(57) ABSTRACT

A method of establishing transmissions to a mobile station in a wireless radio communications system where an indication of the radio service requirement is provided to the mobile terminal. A switch receives a signal originating a call. The switch notifies a network accordingly with a paging message. The paging message is supplied to the mobile station. The indication of the radio service requirement is provides as part of, or with, the paging message. Subsequently, only those cells that fulfil the radio service requirement need be measured to determine which one is to be used for the transmission.

7 Claims, 1 Drawing Sheet

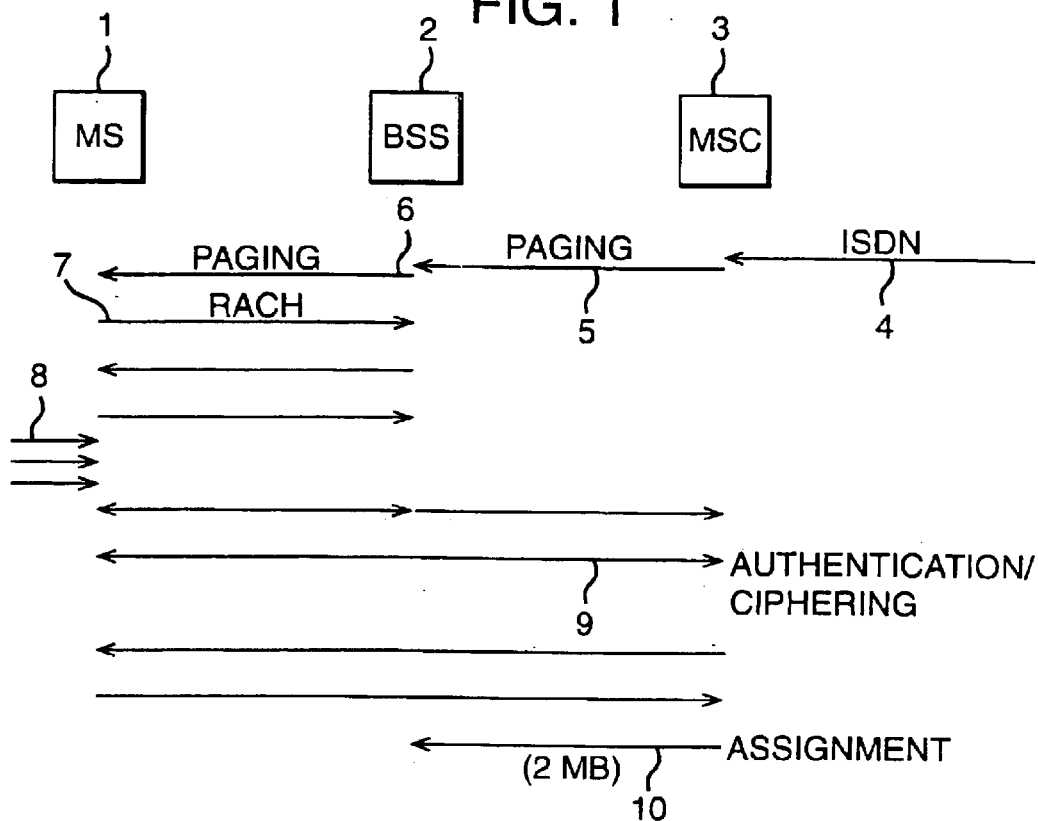
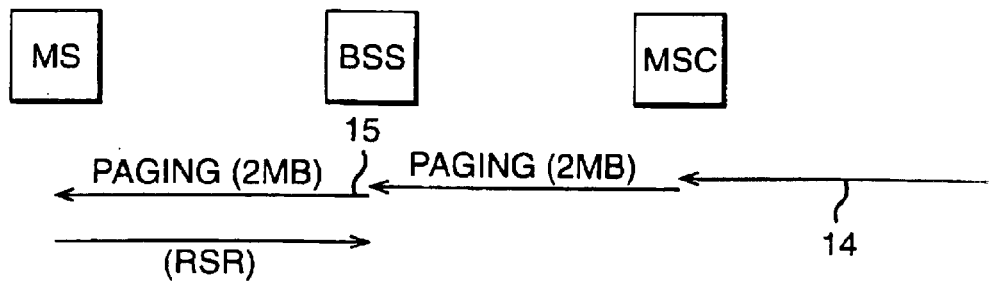
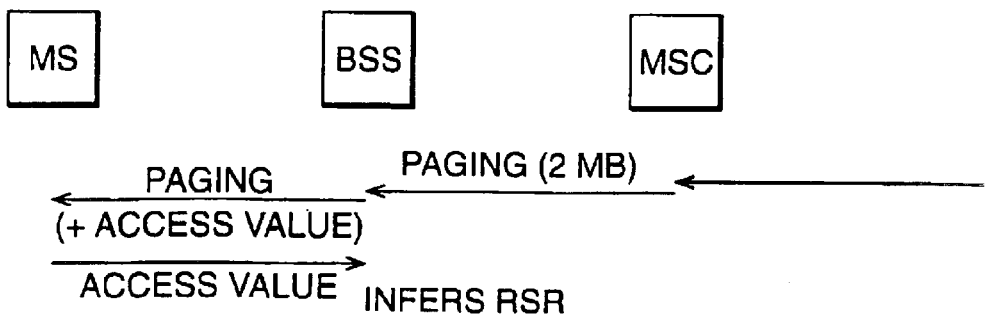

SIGNALLING RADIO SERVICE REQUIREMENTS

CROSS-REFERENCE TO RELATED APPLICATION

This application claims priority of European Patent Application No. 99304440.3, which was filed on Jun. 8, 1999.

FIELD OF THE INVENTION

This invention relates to signalling radio service requirements.

BACKGROUND OF THE INVENTION

In cellular radio communications systems (i.e. mobile phone systems), there are many different types of data or information which are required to be transmitted and each of these different types of data place different requirements upon the system. A simple voice message, for example, requires a lot less resources than a video call. There is also an effect on the size of the cell which the system must allocate to a particular call.

For a mobile originated call, i.e. a call which is originated at mobile equipment, the mobile equipment can easily tell the system what sort of call it is making, e.g. a fax call, a video call and so on. The mobile equipment can indicate, when it initiates the call, the service requirement of that call and the network can then determine the cell that is currently available and that is best adapted to support the required service requirement. The service requirement may include, for example, the data rate necessary.

At present, this type of "service dependent directed retry" can only work for mobile originated scenarios. It is not possible for a mobile terminated scenario. Thus, mobile terminated scenarios generally utilise access and radio resource allocations in a non-optimal fashion, or can take a considerable length of time in which to establish the resources to be used.

Therefore, there is a need for an improved mobile terminated scenario for service dependent directed retry.

SUMMARY OF THE INVENTION

According to the present invention there is provided a method of establishing transmission to mobile equipment via a radio network. The radio network provides the mobile equipment with a paging message. An indication of the radio service requirement is provided as part of, or with, the paging message. The mobile equipment can use the indication of the radio service requirement when making access to the radio network.

Preferably, the mobile equipment informs the radio network of the radio service requirement during an access phase.

The indication of the radio service requirement may be any indication of the radio service requirement. For example, the indication of the radio service requirement may be the radio service requirement itself, or the properties of the cell capable of fulfilling the radio service requirement, or at least a portion of access values that the mobile station would then return to the radio network on an access channel.

Subsequently, the radio network can choose only those cells which are known to meet the radio service requirement, and only these cells need to be measured for selection of one of them for use.

BRIEF SUMMARY OF THE DRAWINGS

Embodiments of the invention will now be described, by way of example only, with reference to the accompanying drawings in which:

FIG. 1 shows schematically a previously proposed paging and call set up arrangement;

FIG. 2 shows a first embodiment of the present invention; and

FIG. 3 shows a second embodiment of the present invention.

DESCRIPTION OF THE PREFERRED EMBODIMENTS OF THE INVENTION

Referring to FIG. 1, a mobile telephone communications system includes one or more mobile stations (MS) 1, a base station sub-system (BSS) 2 and a switching system, or mobile switching centre (MSC) 3. A mobile terminated call is received first by the MSC 3 and this then initiates communication between the MSC 3, the BSS 2 and the MS 1. This ultimately allocates sufficient resources to the system and then allows communication proper to commence. All this can take considerable time, even before the holder of the mobile station is aware that he is being called.

One example is shown in FIG. 1. An incoming call 4 originating from outside the system (e.g. from a landline) is in this case an ISDN call and thus requires a certain amount of resources, which amount is greater than a normal voice call. The MSC 3 sends a paging message 5 to the BSS 2. This in turn sends a paging message 6 to the MS 1. The paging message 6 simply informs the mobile station MS 1 that there is an incoming call that is awaiting resources to be allocated to it. The MS 1 then replies on a random access channel (RACH) 7 and a communications sequence is instigated between the MS 1 and the BSS 2. At some point 8 during this, the MS 1 obtains measurements of all available cells within the cellular radio communications system which are available and sends this data to the BSS, although at this stage the system is not aware of the radio service requirement, i.e. the size of cell or other parameters related to the required cell, which of course depends upon the type and nature of call to be transmitted. An authentication/ciphering step 9 follows and after this has been achieved, the call is finally set up and resources are assigned at 10 (e.g. a cell with 2 MB bandwidth suitable for the message transmission).

However, several seconds can elapse during this process and in the meantime the system has had to search for measurements of all possible cells, most of which will probably not have the resources to handle that particular call in any case. This is wasteful and inefficient in terms of time and, not least, battery life. Before the authentication step, the BSS 2 has to provide the mobile terminal with details of all possible cells to measure, but as it has no indication, at that stage, of the radio service requirement, it has to provide details of all possible available cells.

FIG. 2 shows part of a paging and initiating routine that embodies the present invention. In the case of FIG. 2, when an incoming call 14 comes into the switching network MSC, a paging signal is again sent to the base sub-station, BSS. However, the initial paging signal also includes an indication of the "radio service requirement" and this is shown in the example as an indication that a cell having a bandwidth of 2 MB is required. The BSS then passes this information to the mobile station MS within the paging message 15.

The mobile station then performs access using specific values which indicate to the BSS what radio service requirement is being demanded for the mobile terminated call. The BSS is able from the access value (or information sent later by the mobile station signalling) to determine exactly the internal procedures to perform and the type of system information which will be required. That is, the BSS can inform the mobile station to gather specific information on those cells available which are capable of handling the specific radio service requirement, or whatever type of data is required, at the cell measuring stage, and thus to only look at a smaller subset of the available cells, rather than all the available cells as previously.

FIG. 3 shows an alternative embodiment in which the BSS maintains the context of the paging procedure. In this case, the BSS sends to the MS the value (or part value) to be used on access by the MS. That is, instead of sending the actual radio service requirement, it sends the appropriate values to the mobile station. The radio service requirement is therefore sent 'indirectly'. The MS then sends to the BSS the appropriate value and by decoding this, the BSS can know the radio service requirement by inference.

Accordingly, in embodiments of the invention, the initial paging signal provides an indication, whether directly or indirectly, of the radio service requirement and that can thereby optimise mobile terminated calls.

While the invention has been described with reference to a preferred embodiment and in relation to one particular application, it will be understood by those skilled in the art having reference to the specification and drawings that various modifications may be made, various alternatives are possible therein, and uses in other applications are possible without departing from the spirit and scope of the invention.

What is claimed is:

1. A method of establishing a transmission to a mobile station via a radio network, the method comprising:

providing a paging message to the mobile station;

providing an indication of a radio service requirement to the mobile station, wherein said paging message comprises the indication of the radio service requirement, and wherein said radio service requirement comprises an indication of a desired amount of at least a first network resource, wherein the mobile station uses the indication of the radio service requirement when making access to the radio network to measure only cells capable of meeting the radio service requirement in order to select one of them for use in the transmission.

2. A method as claimed in claim 1, wherein the indication of the radio service requirements comprises properties of the cell capable of fulfilling the radio service requirement.

3. A method as claimed in claim 2, wherein the indication of the radio service requirements comprises the required bandwidth of a cell.

4. A method as claimed in claim 1, wherein the indication of the radio service requirement comprises the radio service requirement.

5. A method as claimed in claim 1, wherein the indication of the radio service requirements comprises at least a portion of at least one access value.

6. A method as claimed in claim 5, wherein the mobile station returns the at least one access value to the radio network on an access channel.

7. A method as claimed in claim 6, wherein the access channel is a random access channel.

* * * * *